United States Patent

Fukuoka et al.

Patent Number: 5,274,220
Date of Patent: Dec. 28, 1993

[54] DATA CARRIER

[75] Inventors: Shinichiro Fukuoka; Yoshimi Kanda; Ryoichi Miyake, all of Kyoto, Japan

[73] Assignee: Omron Corporation, Kyoto, Japan

[21] Appl. No.: 768,439

[22] PCT Filed: Jan. 30, 1991

[86] PCT No.: PCT/JP91/00110
§ 371 Date: Sep. 25, 1991
§ 102(e) Date: Sep. 25, 1991

[87] PCT Pub. No.: WO91/11784
PCT Pub. Date: Aug. 8, 1991

[30] Foreign Application Priority Data

Feb. 2, 1990 [JP] Japan .................................. 2-24789
Feb. 6, 1990 [JP] Japan .................................. 2-27708
Feb. 15, 1990 [JP] Japan .................................. 2-35617

[51] Int. Cl.⁵ .................................... G08B 13/14
[52] U.S. Cl. ................................... 235/487; 235/449; 340/680

[58] Field of Search ............... 235/487, 449; 340/680, 340/573, 825.23, 825.52, 825.72, 825.57

[56] References Cited

U.S. PATENT DOCUMENTS 4,924,210 5/1990 Matsui et al. ..................... 340/572

Primary Examiner—Paul M. Dzierzynski
Assistant Examiner—Don Wong
Attorney, Agent, or Firm—Dickstein, Shapiro & Morin

[57] ABSTRACT

A data carrier according to the present invention writes a signal of a duty ratio corresponding to write data from a resonance circuit at the time of writing data using a shift register as a memory, causes the shift register to store the data, and then holds the data as a circulation mode. Then, the data held in the shift register is externally read out based on identification codes. In this way, a data carrier of a small storage capacity is made with a relatively simple structure.

9 Claims, 19 Drawing Sheets

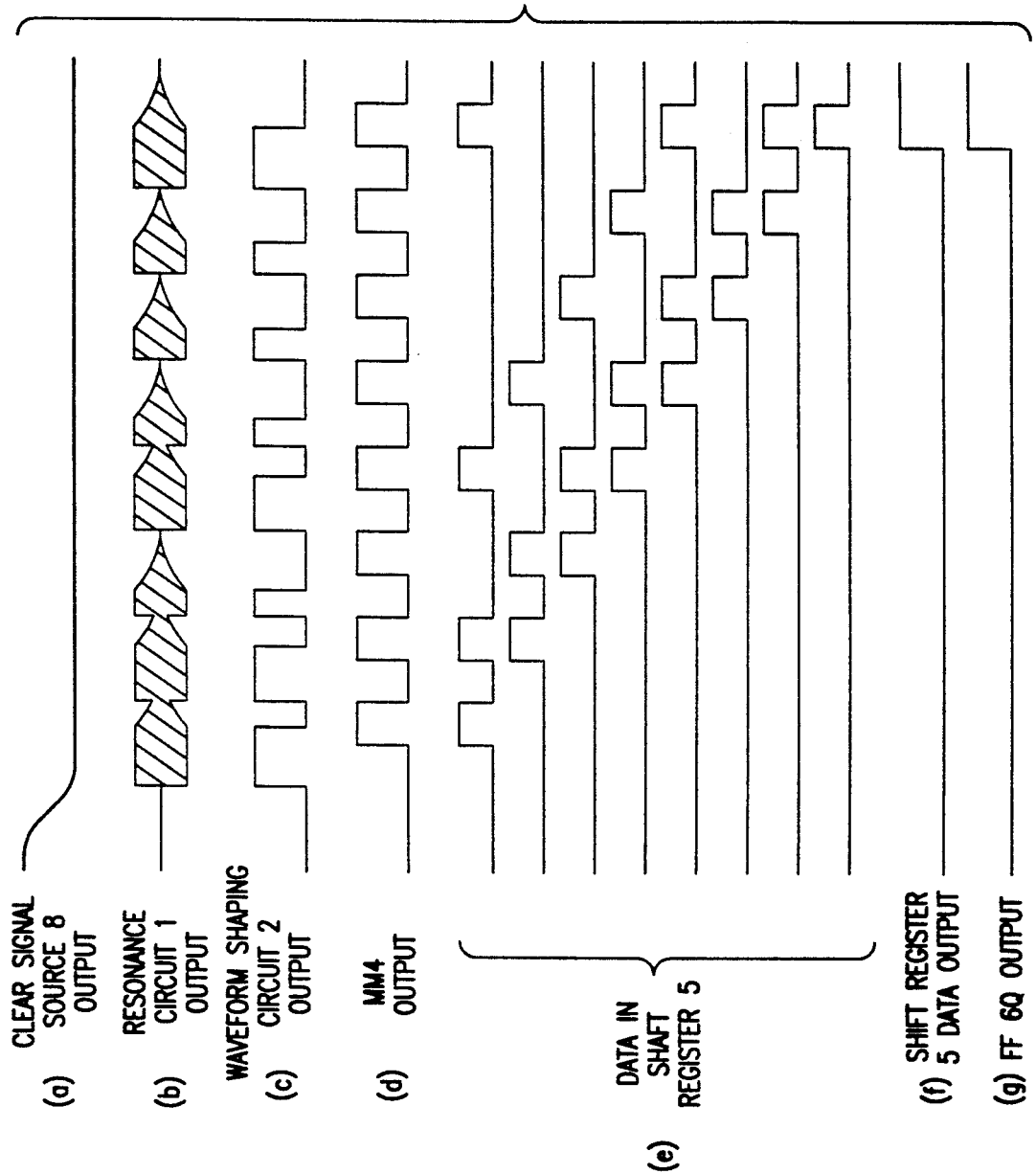

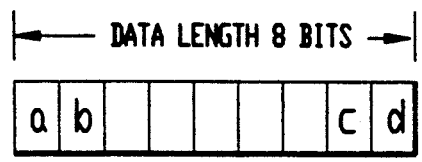
FIG. 5(a)
FIG. 5(b)
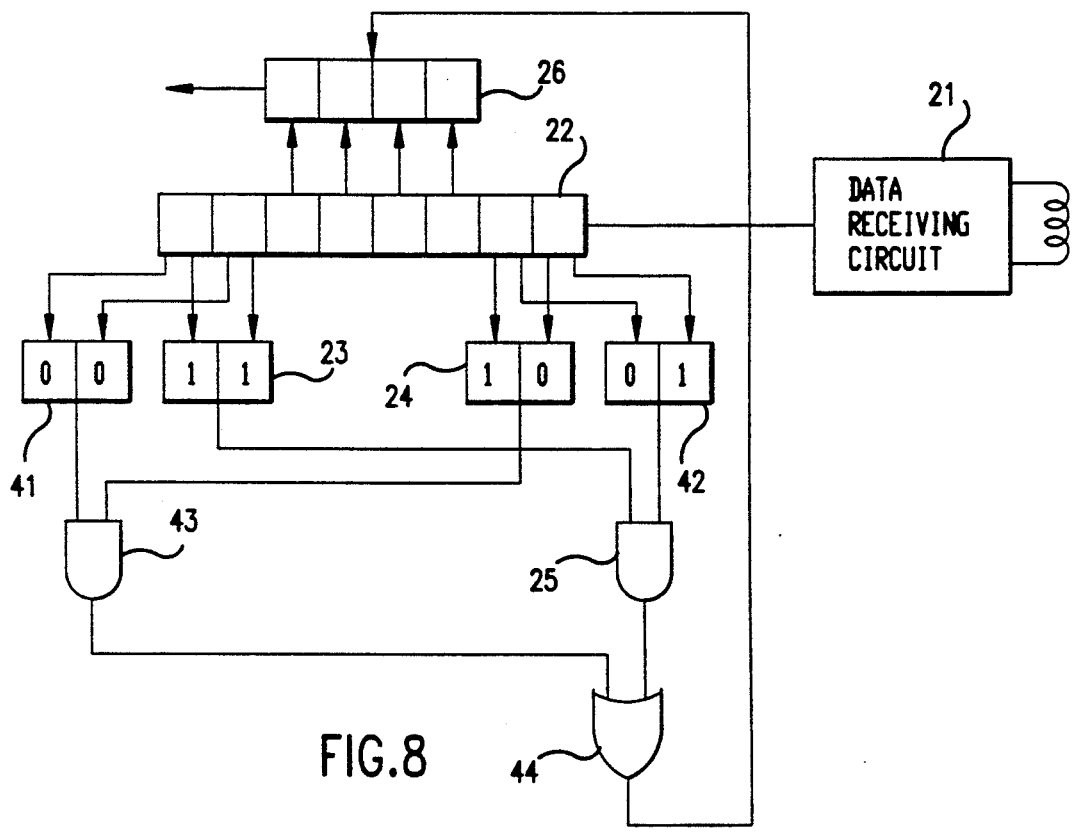
FIG. 8

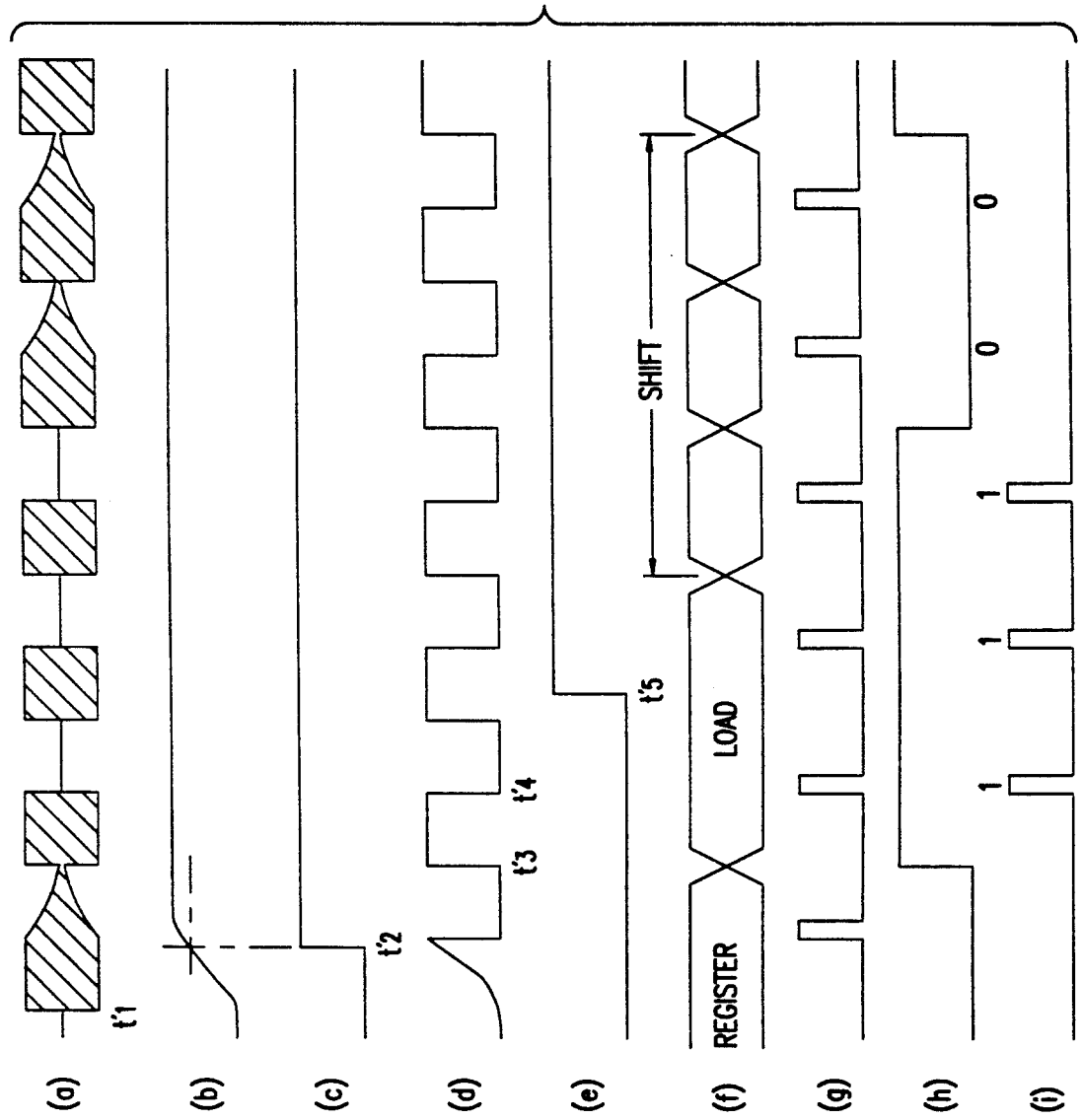

and an article identification system such as a physical distribution system.

DATA CARRIER

TECHNICAL FIELD

The present invention relates to data carriers provided for control of tools for machine tools, parts and products in a factory, or an article identification system such as a physical distribution system.

BACKGROUND ART

Conventionally, in order to mechanize control of tools for machine tools or identification and so on of parts and products at an assembly carriage line in a factory, there is a need for a system for identifying and controlling various kinds of articles such as tools, parts, products and so on. There has been proposed an article identification system, as disclosed in Japanese Patent Laying-Open No. 1-151832, in which a data carrier having a memory is provided for an article to be identified, necessary information is externally written into the memory of data carrier by data transmission, and the information is read out as required.

In such a data carrier, as shown in FIG. 1, a resonance circuit 201 is connected to a coil for reception, a signal obtained at the resonance circuit is waveform shaped in a waveform shaping circuit 202, data is written into a memory 204 through a memory control portion 203 including a gate array, a CPU and so on, or data is read out based on a command given and is supplied by absorbing the vibration of resonance circuit 201 by a vibration absorbing circuit 205.

However, such a conventional data carrier was so structured that it could have a memory of a relatively large storage capacity. Accordingly, the memory control portion formed of the gate array, the CPU and so on became complicated and a memory having a large storage capacity was used, so that it had a disadvantage that the price thereof could not be reduced. Therefore, disadvantageously, it was not suitable for a case where such a memory of a large storage capacity is not required and a small storage capacity, for example, a storage capacity of a memory of several bits to several tens of bits was large enough.

DISCLOSURE OF THE INVENTION

The present invention is made in view of such a problem of a conventional data carrier, and an object thereof is to make it possible to hold a small amount of data with a highly simplified structure suitable for a reduced storage capacity and to write and read data using a conventional write/read control unit as it is.

BRIEF DESCRIPTION OF THE DRAWINGS

FIG. 3 is a waveform diagram showing a waveform of each portion at the time of writing data.

FIG. 4 is a waveform diagram showing a waveform of each portion at the time of reading data.

FIGS. 5a and 5b are diagrams illustrating one example of data containing identification codes to be written into a shift register and an example of patterns of the identification codes.

FIG. 8 is a circuit diagram illustrating a read out circuit of data containing identification codes used on the side of the write/read control unit.

FIG. 11 is a waveform diagram showing a waveform of each portion at the time of reading data.

BEST MODE FOR CARRYING OUT THE INVENTION

Embodiment 1

Figure 1:
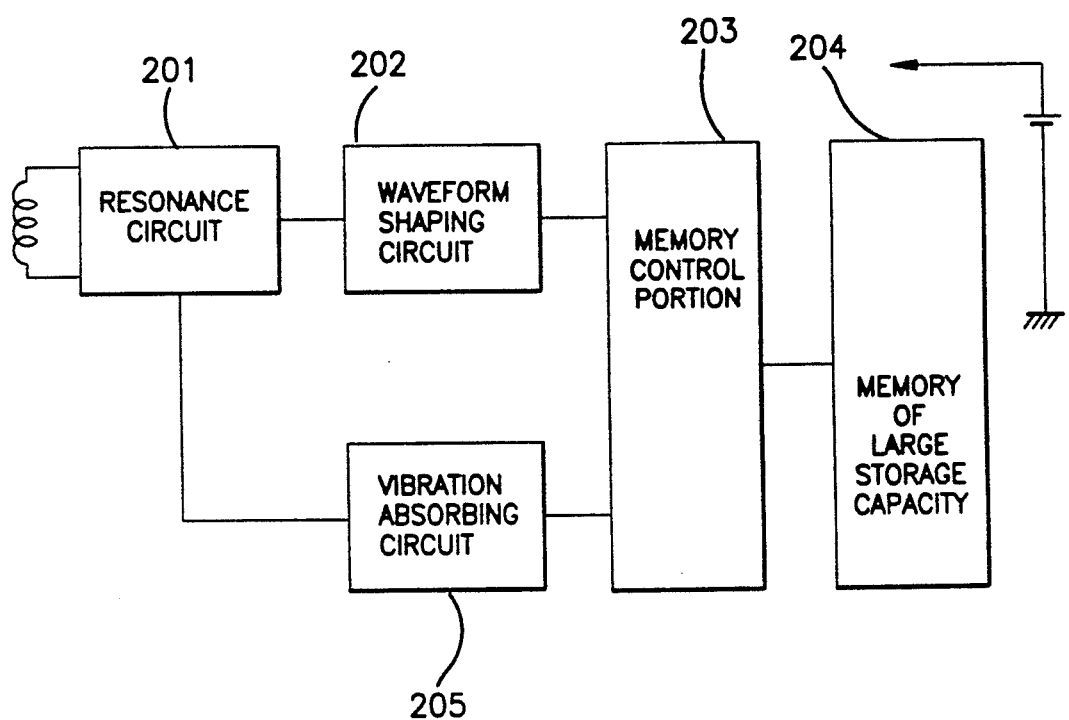
FIG. 1 is a block diagram illustrating one example of a conventional data carrier.
Figure 2:
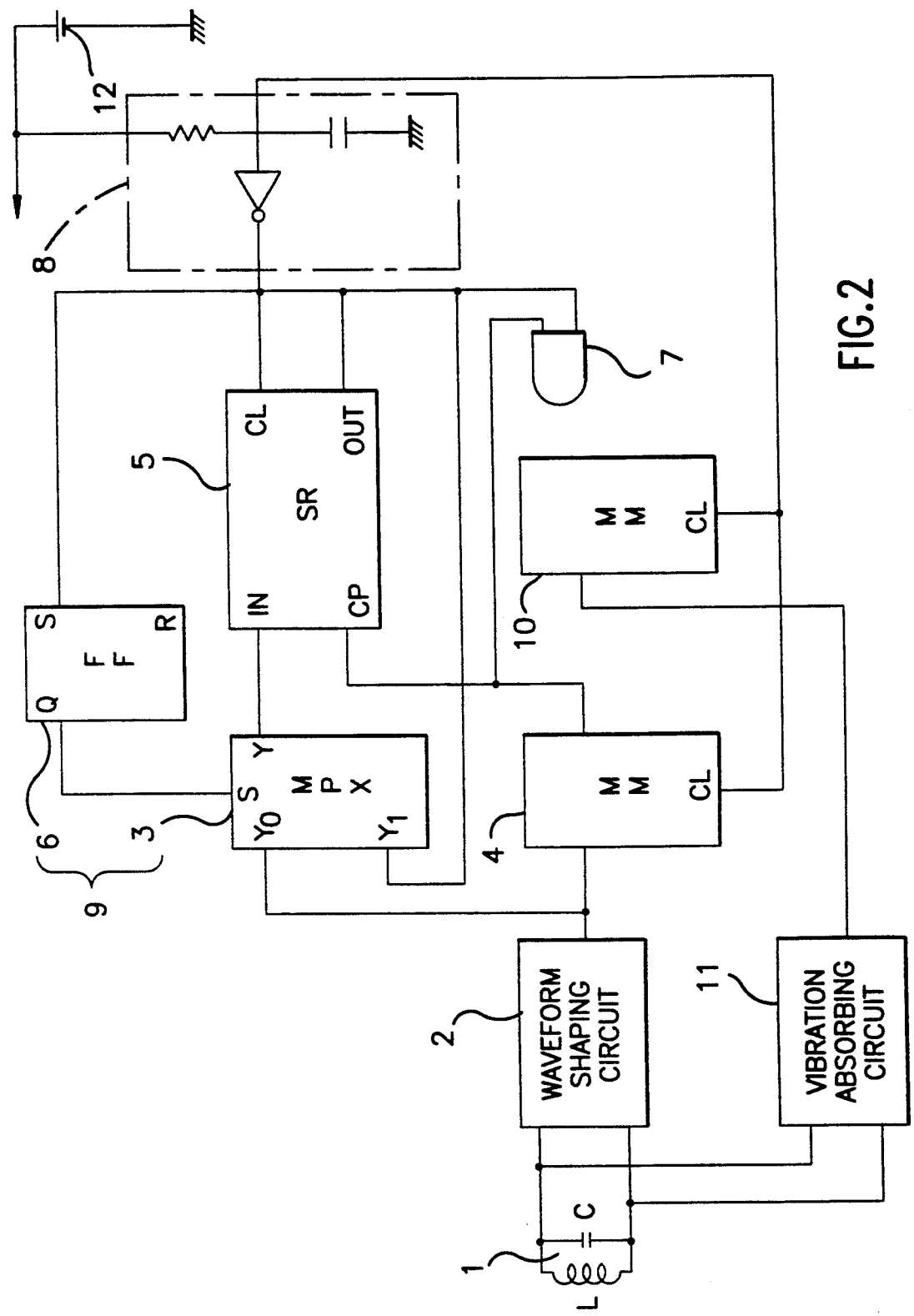
FIG. 2 is a block diagram illustrating a structure of a data carrier in accordance with a first embodiment of the present invention.

FIG. 2 is a block diagram illustrating a structure of a data carrier in accordance with one embodiment of the present invention. In this figure, the data carrier has a resonance circuit 1 including a coil L for reception and a capacitor C and supplies an externally applied PWM modulated signal to a waveform shaping circuit 2. Waveform shaping circuit 2 obtains a reception signal corresponding to the intermittence of the supplied signal by envelop detecting the supplied signal and discriminating the same with respect to a predetermined level, and the output thereof is supplied to a multiplexer (MPX) 3 and a monostable multivibrator (MM) 4. Monostable multivibrator 4 delays the supplied reception signal by a half period, and the output thereof is supplied to a shift register 5 as a shift pulse. Shift register 5 is formed of 8 bits, for example, and the output of multiplexer 3 is supplied to the data input terminal thereof. The data output of the shift register 5 is supplied to the set input terminal of a flipflop (FF) 6, the input terminal of an AND circuit 7 and the other input terminal of multiplexer 3. A clear signal source 8 is provided including a resistor and a capacitor connected to a power supply in series and an inverter connected to the middle point therebetween. Clear signal source 8 supplies a clear signal, which attains H level after the power supply is turned on and attains L level being delayed for a prescribed period of time, to a clear input terminal of shift register 5 and a reset input terminal of flipflop 6. Flipflop 6 switches the input of multiplexer 3 by its Q output, so that the output ($Y_0$) of the above-mentioned waveform shaping circuit 2 is supplied to the input side (IN) of the shift register when the Q output is at L level and the data out input ($Y_1$) of shift register 5 is supplied when it is at H level. In this case, multiplexer 3 and flipflop 6 constitute signal switching means 9 for switching the input signal to shift register 5.

The output of monostable multivibrator 4 is also supplied to AND circuit 7. AND circuit 7 supplies its logical product output to a monostable multivibrator 10 at the time of reading data. Monostable multivibrator 10 is operated for a short period of time in response to data read out from shift register 5 and the output thereof is supplied to a vibration absorbing circuit 11. Vibration absorbing circuit 11 stops reverberations of the received signal by closing a switching element for grounding the both terminals of resonance circuit 1 when a signal of H level is supplied. A back-up battery 12 for holding data of shift register 5 is provided for this data carrier.

In this case, data is written into the data carrier by resetting shift register 5 and flipflop 6 using clear signal source 8 and then supplying a signal having different duty ratios in a fixed period to the reception coil of the data carrier. Such a structure of the write/read control unit for the data carrier is the same as that shown in the above-mentioned conventional one.

The operation in this embodiment will now be described. When the power supply is turned on before writing data, a signal of H level is supplied to shift register 5 and flipflop 6 from clear signal source 8 for a short period of time, to clear shift register 5 and the flipflop is reset. Thereafter, a write/read control unit (not shown) supplies a signal of discontinuous waveform having a fixed period T and a duty ratio corresponding to data to be written. For example, a signal having a duty ratio of 70% is supplied at logic "1" and a signal having a duty ratio of 30% is supplied at logic "0", to reception coil L as shown in FIG. 3(b). As a result, the signal is received by resonance circuit 1, envelop detected by waveform shaping circuit 2 and discriminated with respect to a predetermined level, so that a signal as shown in FIG. 3(c) is obtained. This signal is supplied to monostable multivibrator 4 to be supplied to shift register 5 as a signal ½ period delayed from the rising point and having a duty ratio of almost 50% as shown in FIG. 3(d). At first, since flipflop 6 is reset, the output of waveform shaping circuit 2 is directly written into shift register 5 through multiplexer 3. As shift register 5 has a structure of 8 bits, when data of 8 bits is written as shown in FIG. 3(e), the output at data output terminal of shift register 5 attains H level. As a result, flipflop 6 is inverted and then the output of shift register 5 is directly supplied to the input of shift register 5 through multiplexer 3. Accordingly, even if data is transmitted, the data is not written in a duplicated way, data of shift register 5 circulates and the data is held in shift register 5. In this case, it is necessary to set data to be written at first to "1" in order to change shift register 5 from a write mode to a circulation mode. In this way, writing of data is finished after the signal is written into shift register 5 as shown in FIG. 3(e).

Reading of data will now be described. The write/read control unit, in reading data from the data carrier, supplies a signal having a fixed duty ratio, for example, 50% in the same period as the period at the time of the above-mentioned data writing as shown in FIG. 4(a). Then, the signal is shaped through resonance circuit 1 and waveform shaping circuit 2 and a signal shown in FIG. 4(b) is supplied from waveform shaping circuit 2. Then, a signal delayed by a half period is obtained from monostable multivibrator 4 as shown in FIG. 4(c) and this signal is applied to shift register 5 as a shift pulse. Accordingly, a signal is read out from shift register 5 corresponding to the shift pulse as shown in FIG. 4(d). In this case, a signal is supplied from AND circuit 7 as shown in FIG. 4(e), which attains "H" level when a logic signal "1" is read out and attains "L" level when "0" is read out. Then, this signal is supplied to vibration absorbing circuit 11 by monostable multivibrator 10 as a vibration absorption control signal for a short period of time of a half period or less. Vibration absorbing circuit 11 closes a switching element connected to the both terminals of resonance circuit 1, so that reverberations are inhibited in the period when this signal is being supplied as shown in FIG. 4(a). Accordingly, as shown in FIG. 4(a), a signal is obtained at the both terminals of resonance circuit 1, with reverberations when the logic signal is at H with a fixed duty ratio and without reverberations when the logic signal is 0. Since this signal is also detected on the side of a read/write head (not shown) in the same way, the read/write head can read out the signal written into shift register 5 based on the presence or absence of reverberations as shown in FIG. 4(g) and (h).

Figure 6:
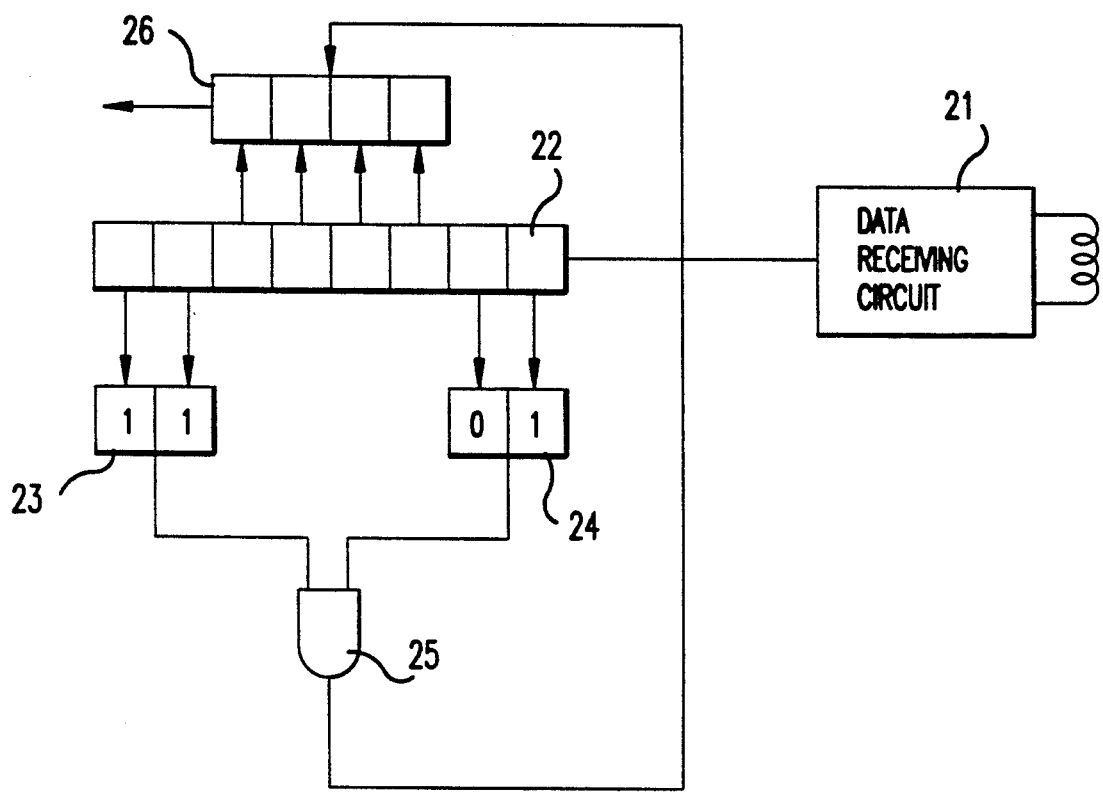
FIG. 6 is a circuit diagram illustrating a read out circuit of data containing the identification codes provided on the side of a write/read control unit.

If 8 or more bits are successively read out, the same data is repeatedly outputted. Even if reading of data is not necessarily carried out on a 8-bit basis and reading of data is stopped halfway, as well, it is necessary to make it possible to read the data. A description will now be made of a structure of identification codes for making it possible. Suppose that a data length is, for example, 8 bits, the first 2 bits a and b and the last 2 bits c and d are identification codes ID as shown in FIG. 5(a), and 4 bits therebetween are bits which the user can use at his option. Then, code patterns which the identification codes can take become those as shown in FIG. 5(b). The patterns of the identification codes, however, can not be arbitrarily determined and have a limitation as follows. That is, the first identification code a needs to be 1 since the shift register is to be switched from the write mode to the circulation mode. Accordingly, the patterns ① to ④ can not be taken. If the first identification codes "ab" coincide with the last identification codes "cd", data is read out in cycles, so that it becomes impossible to determine which are the head identification codes. Accordingly, a and b can not coincide with c and d at the same time and the patterns ① and ⑧ can not be taken. Therefore, a possible identification code pattern is any of ⑤, ⑥ and ⑦ in FIG. 5(b). In the embodiment stated above, there is shown a case where the pattern of ⑦ is used as identification codes (ID) as shown in FIGS. 3 and 4. It is necessary to make it possible to correctly read out data written by the user even if reading is started from halfway along the data of 8 bits obtained in such a way on the side of the write/read control unit. FIG. 6 is a diagram illustrating one example of such a code identification circuit. In this figure, the write/read control unit waveform-shapes the output of a data receiving circuit 21 to supply the same to a shift register 22 of 8 bits. Then, the first 2 bits and the last 2 bits are compared, respectively, by digital comparators 23 and 24. Comparators are provided in respective comparators 23 and 24 having identification codes held in the shift register in advance, for example, "ab"="11" and "cd"="01" in the above-mentioned embodiment, and coincidence outputs of them are detected by an AND circuit 25. A register 26 for temporarily holding data is connected to the intermediate 4 bit output terminals of shift register 22. Then, when a coincidence signal is supplied from AND circuit 25, the operation of shift register 22 is stopped, and the intermediate 4 bits are saved in register 26, and serial data is read out from this register 26. In this way, any data written into the shift register of the data carrier can be read out again.

While the shift register of the data carrier has a structure of 8 bits in this embodiment, the present invention may be applied to other structures. For example, when a shift register having a structure of 16 bits, the first 4 bits and the last 4 bits, for example, are used as identification codes, and arbitrary data of 8 bits may be written therebetween. In the identification codes, the numbers of first and last bits need not be necessarily the same and any number can also be chosen.

As described in detail, in accordance with this embodiment, the shift register is used as a memory of the data carrier. Accordingly, once data is written, it is held as it is and then the data can be read out repeatedly by externally supplying a signal of a prescribed duty ratio. Additionally, if reading is stopped halfway, the intermediate write data interposed between the identification codes can be certainly read out. Accordingly, an effect can be attained that a data carrier of a small storage capacity can be made with a highly simplified structure.

Embodiment 2

Figure 7:
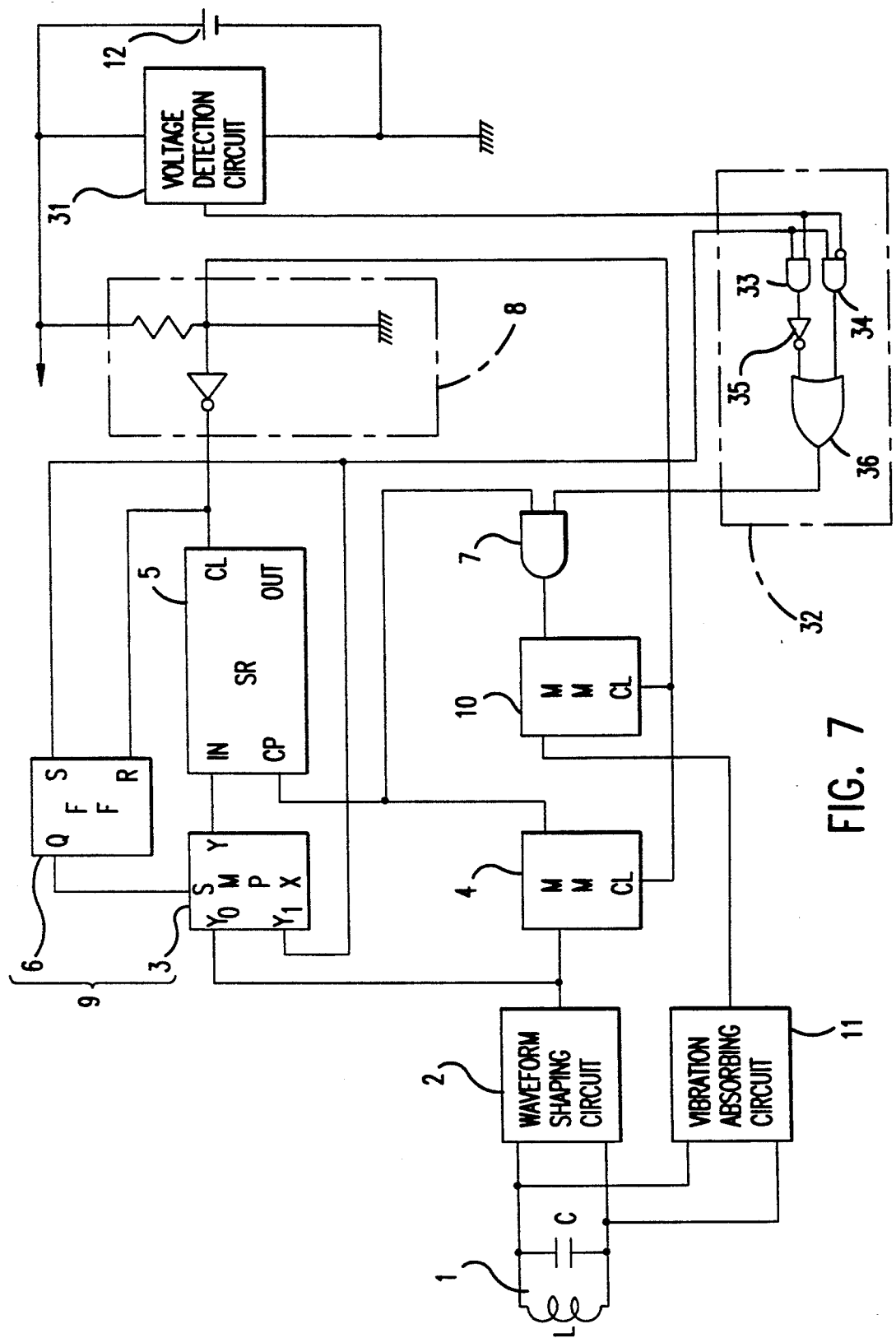
FIG. 7 is a block diagram illustrating a structure of a data carrier in accordance with a second embodiment of the present invention.

A data carrier according to a second embodiment will now be described with reference to FIG. 7. In this embodiment, the voltage drop of a battery of the data carrier can be recognized on the side of a read/write head. In this figure, portion the same as those in the above-mentioned first embodiment are given the same reference designations and a detailed description thereof will be omitted. In this embodiment, there is provided a voltage detection circuit 31 for a battery 12 for detecting the drop of the terminal voltage and the output thereof is supplied to a signal inversion circuit 32. Signal inversion circuit 32, given a signal read from a shift register 5, inverts the signal when the drop of the voltage is detected and supplies data through an AND circuit 7.

The signal read out from shift register 5 is supplied to AND circuits 33 and 34 of signal inversion circuit 32 and the respective outputs are supplied to an OR circuit 36 directly and through an inverter 35. OR circuit 36 supplies a logical sum signal of these outputs to AND circuit 7. Voltage detection circuit 31 supplies a signal at L level when the voltage level is high and a signal at H level when the voltage drops, to the inversion input terminals of AND circuit 33 and AND circuit 34. The output of a monostable multivibrator 4 is also supplied to AND circuit 7. AND circuit 7 supplies a logical product output of the logical sum signal of OR circuit 36 and a delay signal to a monostable multivibrator 10. Other structures are the same as those in the first embodiment stated above.

The operation in this embodiment will now be described. The data writing process is the same as that in the first embodiment stated above, and at the time of reading data as well, if the output of voltage detection circuit 31 is at L level, the signal read out from shift register in synchronization with a shift pulse applied to shift register 5 is provided to AND circuit 7 through AND circuit 34 and OR circuit 35. Accordingly, the signal is read out in the same way as in the first embodiment.

On the other hand, when the voltage level of battery 12 drops and the output of voltage detection circuit 31 attains H level, the signal read out from shift register 5 is inverted through AND circuit 33, inverter 35 and OR circuit 36 of signal inversion circuit 32 and applied to monostable multivibrator 10. Accordingly, all data is inverted and supplied to the side of the read/write head.

It is necessary to make it possible to correctly read out data written by the user on the side of the write/read control unit even if reading is started somewhere along the data of 8 bits obtained in this way. FIG. 8 is a block diagram illustrating one example of such a code identifying circuit. In this figure, portions the same as those in FIG. 6 stated above are given the same reference designations and a detailed description thereof will be omitted. In this identifying circuit, comparators 41 and 42 are provided in parallel for digital comparators 23 and 24, respectively, for holding identification codes obtained by inverting the logics. Comparison values to be inverted codes of identification codes held in the shift register, i.e., "ab"="00" and "cd"="10" in the above-mentioned embodiment are set in comparators 41 and 42 in advance and coincidence outputs of them are detected by an AND circuit 43. An OR circuit 44 is provided for taking a logical sum of AND circuits 25 and 43 and the logical sum output is supplied to a shift register 26. Then, if a coincidence signal is supplied from either one of AND circuits 25 and 43, the operation of shift register 26 is stopped through OR circuit 44, the intermediate 4 bits are saved in register 26, and serial data is read out from this register 26. In this way, arbitrary data written into the shift register of the data carrier can be read out again. In this case, as stated above, when the voltage of a battery 12 is normal, data is read out by the coincidence signal from AND circuit 25, and when the voltage drops, it is read out by the coincidence signal from AND circuit 43, so that it is possible to recognize the written data as well as the state of the battery by identifying data obtained along with this coincidence signal. Additionally, data is not lost due to the drop of the battery voltage, having the effect of being able to enhance the reliability.

Embodiment 3

Figure 9:
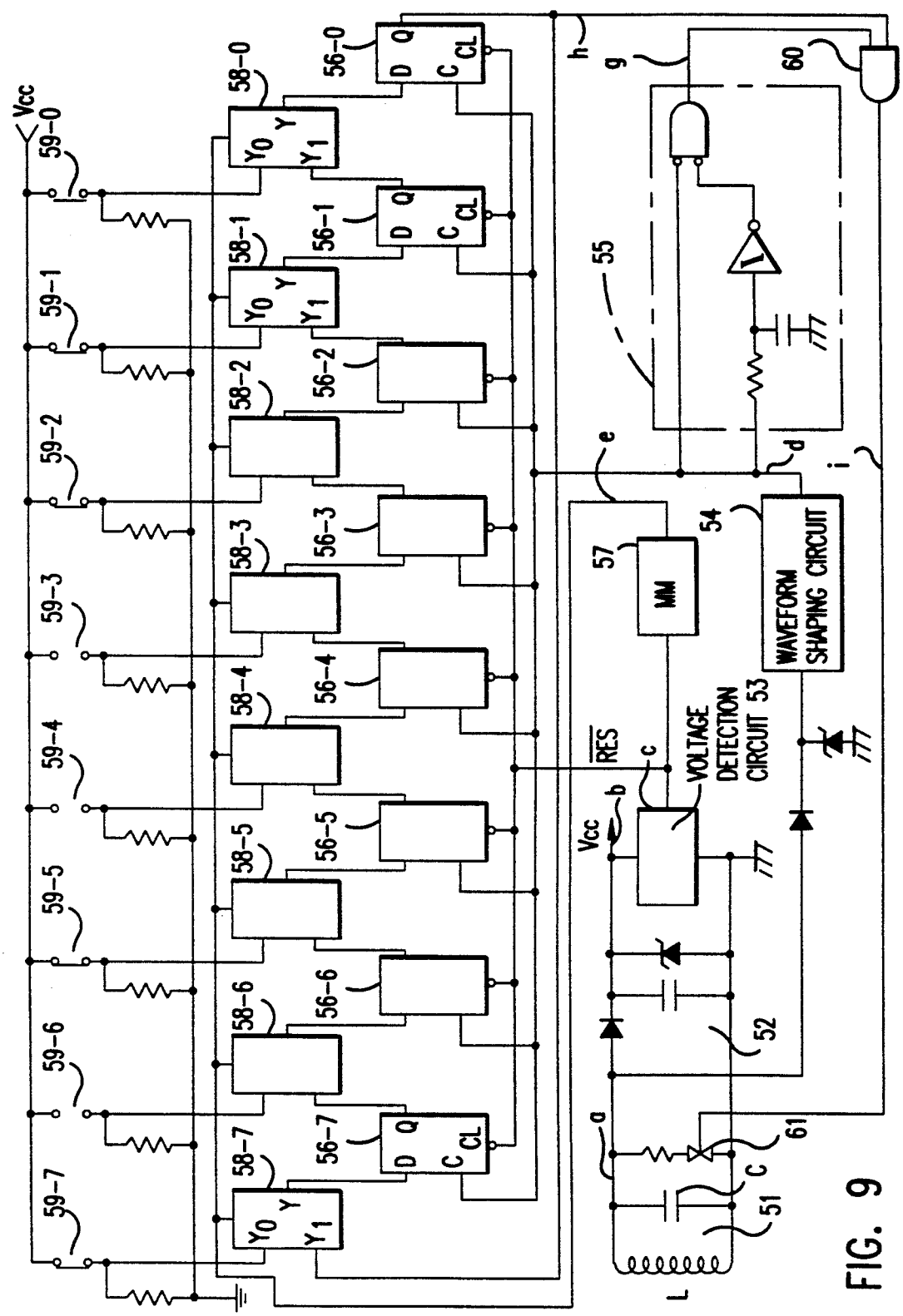
FIG. 9 is a block diagram illustrating a structure of a data carrier in accordance with a third embodiment of the present invention.

A third embodiment will now be described. In this embodiment, it is unnecessary to write data into a data carrier using a write/read control unit and data can be directly written into the data carrier. In FIG. 9, the data carrier includes a resonance circuit 51 formed of a coil L for reception and a capacitor C and, a rectifying circuit 52 for rectifying a signal and a voltage detection circuit 53 for detecting the output level thereof are connected to one terminal. A waveform shaping circuit 54 for waveform shaping the signal is connected to resonance circuit 51. Waveform shaping circuit 54 obtains a reception signal corresponding to the intermittence of the signal by envelop detecting the supplied signal and discriminating the same with respect to a predetermined level and the output thereof is supplied to a falling detector 55 and a shift register 56 including, for example, eight D flipflops (FF) 56-0 to 56-7. The output of voltage detection circuit 53 is applied to these DFFs 56-0 to 56-7 as a reset signal and furthermore supplied to a monostable multivibrator (MM) 57. Monostable multivibrator 57 delays the reset signal for a prescribed period of time and supplies the delayed signal to multiplexers 58-0 to 58-7. Multiplexers 58-0 to 58-7 have the input terminals connected to the outputs of data setting circuits 59-0 to 59-7 of 8 bits and the outputs of DFFs 56-1 to 56-7 and 56-0, respectively, and select the inputs to supply the same to DFFs 56-0 to 56-7. Data setting circuits 59-0 to 59-7 supply data to shift register 56 including D flip-flops 56-0 to 56-7. The output of DFF 56-0 of the shift register and the output of falling detector 55 are supplied to an AND circuit 60. AND circuit 60 controls a vibration absorbing circuit 61 based on a logical product signal of them. Vibration absorbing circuit 61 is connected to the both terminals of resonance circuit 51 as shown in FIG. 9 and short-circuits the both terminals of resonance circuit 51 by an externally applied signal.

Figure 10A:
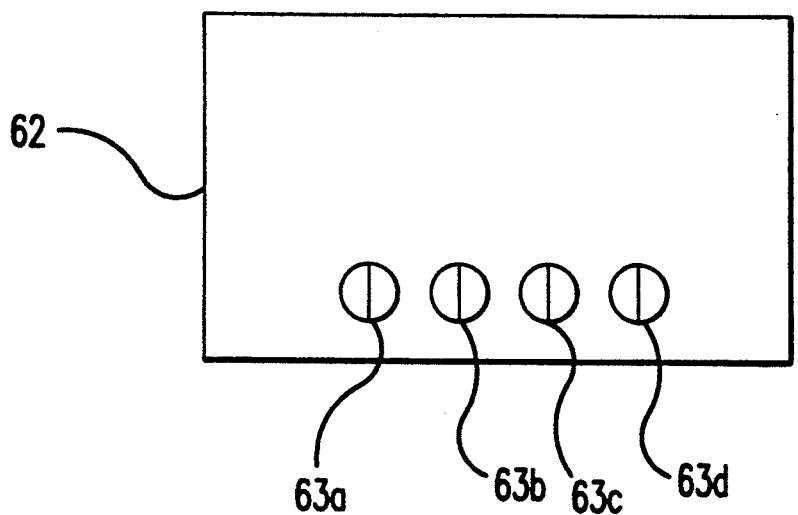
FIGS. 10a and 10b are diagrams of the appearance of a data carrier.
Figure 10B:
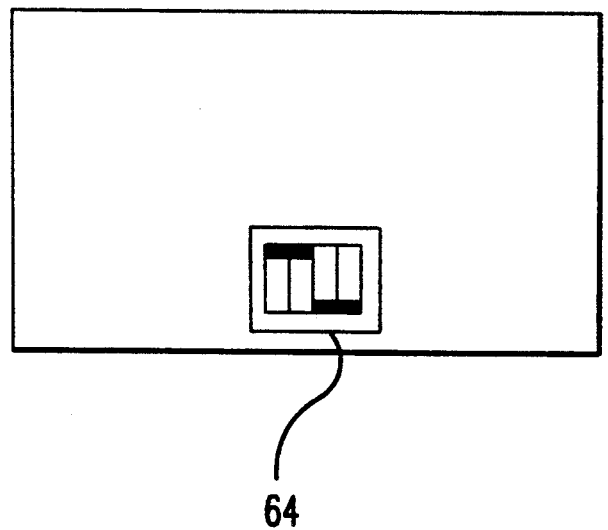

In this case, the data carrier is so structured that the operator can set data by data setting circuit 59 at his option. For example, the first and second 2 bits among data of 8 bits to be set are provided as identification codes in the same way as in the first embodiment and data of other 4 bits is data to be set arbitrarily by the user. Apertures having a round shape 63a to 63d are provided for a data setting portion in the data carrier 62 as shown in FIG. 10(a) and a wire is stretched in each aperture. One end of each of the wires is connected to the power supply and the other end of each of them is grounded through a resistor and connected to the input terminal of the multiplexer to form data setting circuits 59-2 to 59-5. Since data setting circuits 59-0, 59-1, 59-6 to 59-7 set identification codes, no aperture portion is provided in data carrier 62 itself so that the user can not set at his option. In this way, it is possible to set an arbitrary code in a very easy way by disconnecting wires. A dip switch 64 may be provided for setting data as shown in FIG. 10(b) in place of data setting by such a disconnection of wires. In this case, data setting circuit 59 and data setting portion of the data carrier constitute data setting means for setting data by the user at his option and shift register 56, multiplexers 58-0 to 58-7, falling detector 55 and AND circuit 60 form data reading means for reading out the set data.

The operation in this embodiment will now be described with reference to the waveform diagram of FIG. 11. In the figure, (a) to (i) are waveform diagrams corresponding to a to i in FIG. 9. Since the user sets writing of data by disconnecting wires in this embodiment, reading of data is only carried out. FIG. 11 is a waveform diagram at the time of reading out data, and a signal of a fixed duty ratio, for example, 50% is supplied from the write/read control unit at the time of reading at and after time $t_1$ as shown in FIG. 11(a). In this way, the signal is received through resonance circuit 51, a reset signal $\overline{RES}$ is supplied to the clear input terminal CL of shift register 56 from voltage detection circuit 53 through rectification circuit 52 and voltage detection circuit 53 at time $t_2$ delayed for a prescribed period of time from time $t_1$ as shown in FIG. 11(b), and all the DFFs of shift register 56 are cleared. Then, a clock signal is transmitted to the clock input terminal of shift register 56 at the rising point $t_3$ of the output of waveform shaping circuit 54 as shown in FIG. 11(d), and at that time, data of 8 bits of code setting circuit 59 is written through multiplexer 58. It is reset at time $t_2$ and the output is supplied to the selection input terminals of multiplexers 58-0 to 58-7 from monostable multivibrator 57 at time $t_5$ a prescribed period of time after that, and then shift register 56 goes into the circulation mode. When a pulse as shown in FIG. 11(g) is supplied from the output of falling detector 55 at and after time $t_5$, data is shifted by shift register 56. Accordingly, a serial signal set as shown in FIG. 11(h) is sequentially read out. Vibration absorbing circuit 61 is operated by the logical product of the output from DEF 56-0 and the falling detection signal by AND circuit 60. At this time, vibration absorbing circuit 61 closes a switching element connected to both terminals of resonance circuit 51, so that reverberations are inhibited in the period when the signal is supplied as shown in FIG. 11(a). Accordingly, a signal is obtained at the both terminals of resonance circuit 51, with reverberations when the logic signal is H with a fixed duty ratio and without reverberations when the logic signal is 0. Since this signal is also detected in the same way as on the side of a read/write head (not shown), the read/write head can read out the signal written into the shift register based on the presence or absence of reverberations. The structure of data in this embodiment is the same as that in the first embodiment and the first 2 bits a and b and the last 2 bits c and d are used as identification codes. In this way, the user can use the intermediate 4 bits at his option and reproduce data in the above-mentioned circuit.

Embodiment 4

Figure 12:
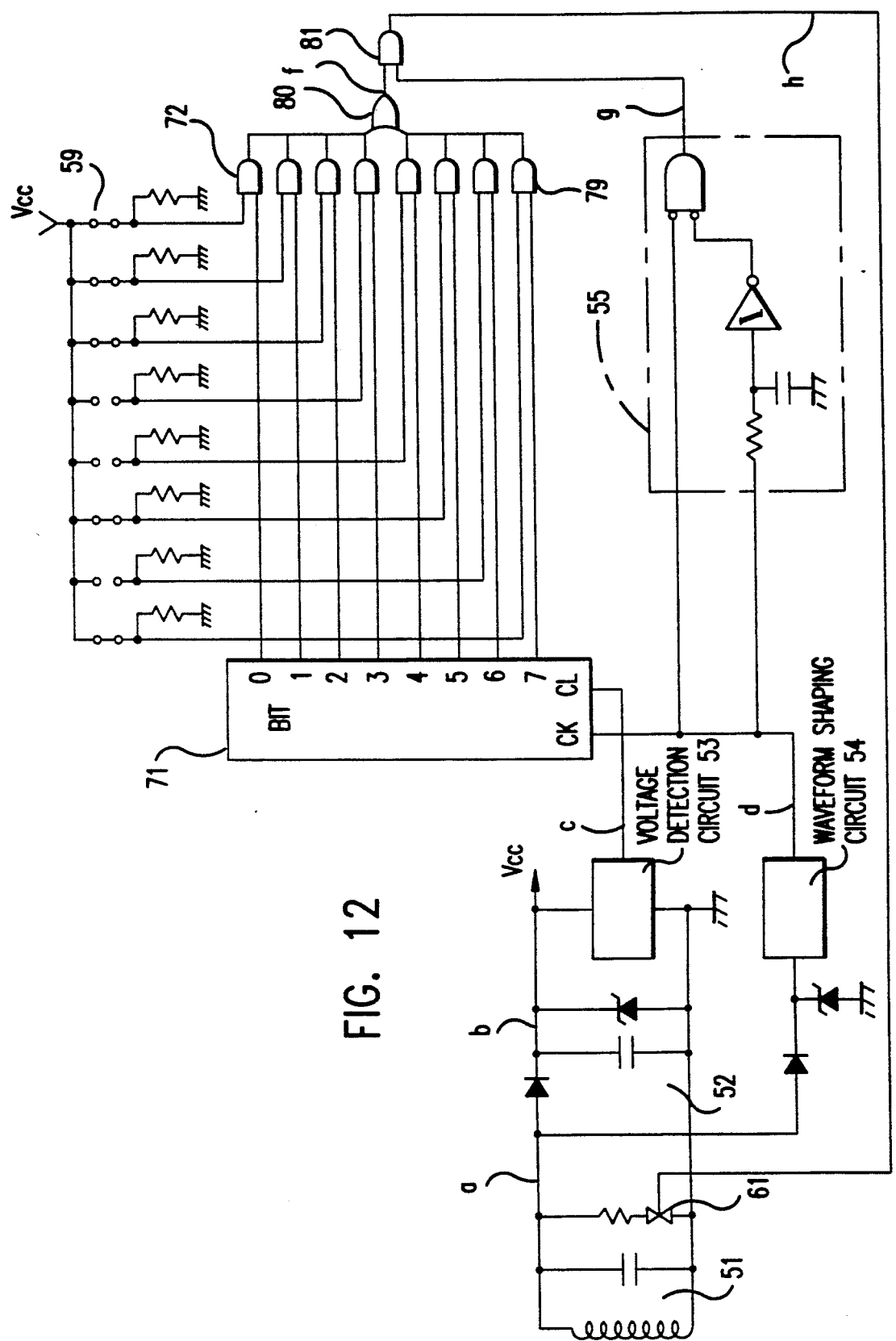
FIG. 12 is a block diagram illustrating a structure of a data carrier in accordance with a fourth embodiment of the present invention.

A fourth embodiment of the present invention will now be described. This embodiment also discloses a data carrier in which data can be directly set in the same way as in the third embodiment. In FIG. 12, portions the same as those in FIG. 9 are given the same reference designations and a detailed description thereof will be omitted. A rectification circuit 52, a voltage detection circuit 53 and a waveform shaping circuit 54 are connected to a resonance circuit 51 and the output of waveform shaping circuit 54 is supplied to a falling detector 55 in this embodiment as well. The output of waveform shaping circuit 54 is supplied to a Johnson counter 71 of 8 bits. 8-bit Johnson counter 71 sequentially supplies a signal of H level from eight output terminal bits 0 to 7 based on an input signal and the output thereof is supplied to an OR circuit 80 through AND circuits 72 to 79. The other input terminal of each of AND circuits 72 to 79 is connected to the data setting circuit 59 stated above. AND circuits 72 to 79 supply each logical product output of Johnson counter 71 to OR circuit 80. OR circuit 80 supplies its logical sum signal to an AND circuit 81. AND circuit 81 intermittently brakes the effects of resonance circuit 51 through vibration absorbing circuit 61 by the logical product of the outputs of falling detector 55 and OR circuit 80. In this case, Johnson counter 71, AND circuits 72 to 79, OR circuit 80 and AND circuit 81 form data reading means for sequentially reading out data set by the data setting portion.

Figure 13:
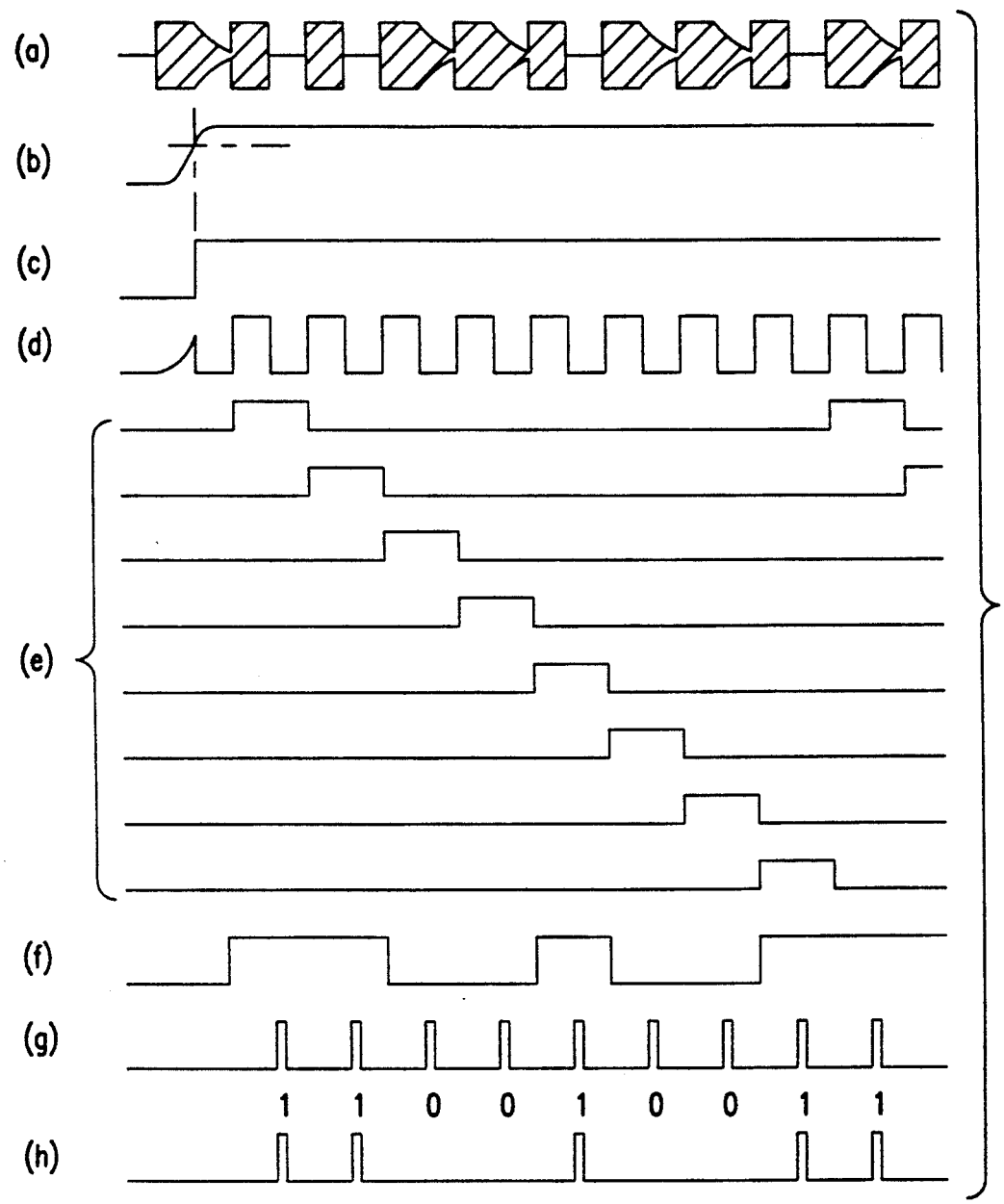
FIG. 13 is a waveform diagram showing a waveform of each portion in the fourth embodiment.

The operation in this embodiment will now be described with reference to the waveform diagram in FIG. 13. When an intermittent signal is supplied to the side of the data carrier from a write/read control unit (not shown) with a prescribed duty ratio in the same way as in FIG. 11(a), it is reset before the power supply is provided to each portion as shown in FIG. 13(a) to (d). Then, a clock signal is supplied to Johnson counter 71 in each prescribed period, and then signals having different timings are sequentially supplied from respective output terminal bit 0 to bit 7 of Johnson counter 71 in accordance with the clock signal as shown in FIG. 13(e). Since the signal is read out through OR circuit 80 by the logical product of this signal and each bit of data setting circuit 59 as shown in FIG. 13(f), the presence or absence of reverberations is controlled by the output set in the same way as in the above-mentioned first embodiment. Accordingly, the signal can be read out on the side of the write/read control unit in accordance with the presence or absence of the reverberations.

Since the user can set data with his own hand in this embodiment, it is possible to set data in a very easy way and confirm the data. Furthermore, data can be held without using a battery, so that its life time can be considerably prolonged without limitations by the life time of the battery, and additionally its resistance to environments can be enhanced sharply. Additionally, data can be repeatedly read out by externally supplying a signal of a prescribed duty ratio. Furthermore, even if reading is stopped halfway, the intermediate write data interposed between the identification codes can be surely read out. Accordingly, an effect is obtained in which a data carrier of a small storage capacity can be made with a highly simplified structure.

Embodiment 5

Figure 14:
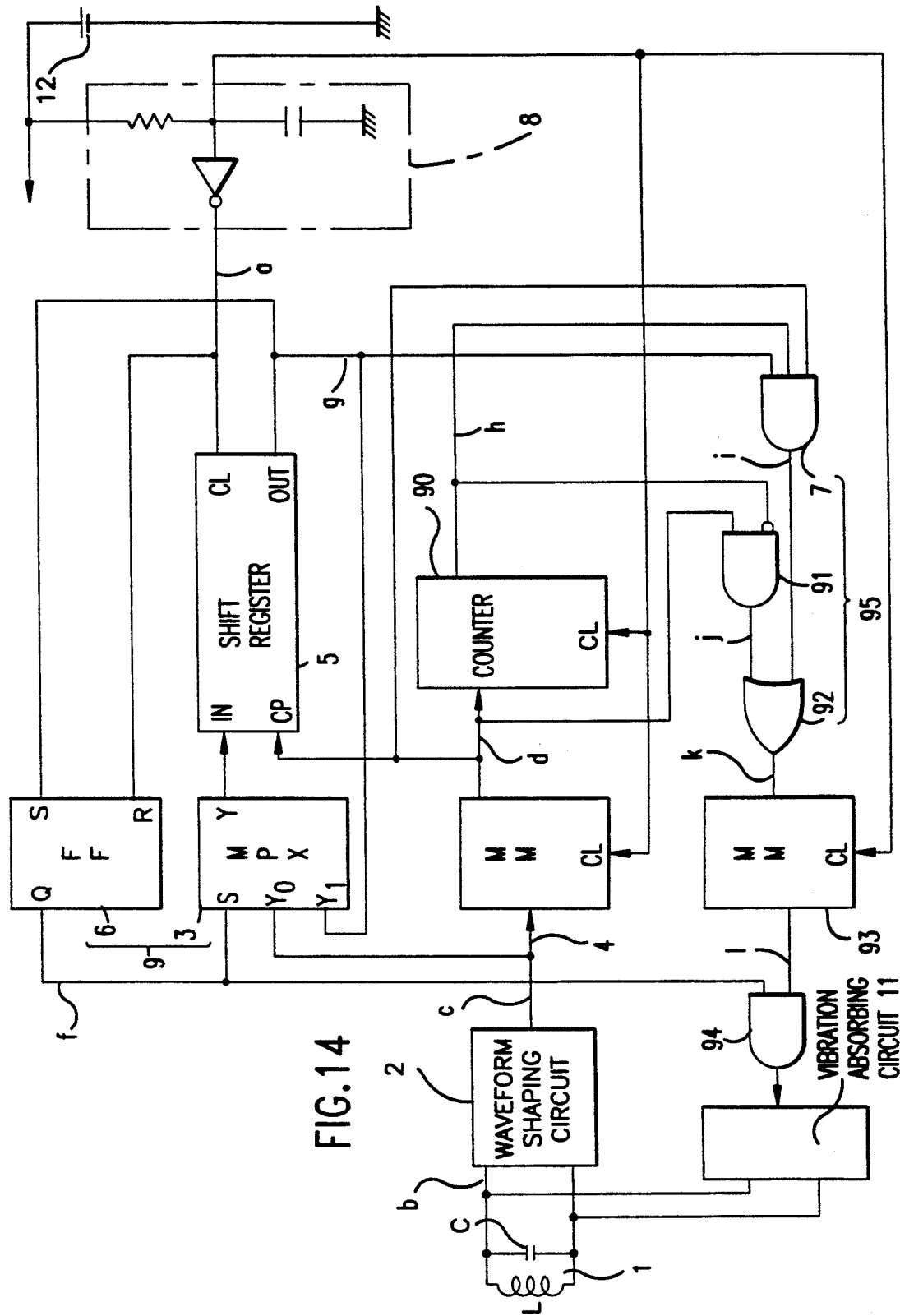
FIG. 14 is a block diagram illustrating a structure of a data carrier in accordance with a fifth embodiment of the present invention.

A fifth embodiment in accordance with the present invention will now be described. In this embodiment, data of an amount almost equal to the storage capacity of a shift register within a data carrier can be stored without employing identification codes. FIG. 14 is a block diagram showing the overall structure of a data carrier in accordance with this embodiment. In this figure, portions the same as those in the above-mentioned first embodiment are given the same reference designations and a detailed description thereof will be omitted. In this embodiment, the output of a resonance circuit 1 is shaped by a waveform shaping circuit and supplied to a shift register 5 through a multiplexer 3 and, at the same time, the output of a monostable multivibrator 4 is supplied to the shift register as a shift pulse in the same way as in the first embodiment.

The output of the monostable multivibrator 4 is supplied to an AND circuit 7 and a counter 90 as well in this embodiment. Counter 90 is cleared by a clear signal source 8 and counts the output pulses of monostable multivibrator 4 and inverts the output with the input of the same number of bits as that of shift register 5, i.e., 8 bits in this embodiment. The output of counter 90 is supplied to AND circuit 7 and an AND circuit 91. AND circuits 7 and 91 supply their logical product signals to a monostable multivibrator 93 through an OR circuit 92. Monostable multivibrator 93 is operated for a short time in response to the data read from the shift register 5 and the clock pulse and the output thereof is supplied to an AND circuit 94. The Q output of a flip-flop 6 is supplied to the other input terminal of AND circuit 94 and its logical product signal is applied to a vibration absorbing circuit 11. In this case, AND circuits 7, 91 and OR circuit 92 form read out data selecting means 95 for selecting a shaping pulse of a waveform shaping circuit 2 and an output pulse from shift register 5. Vibration absorbing circuit 11 is provided for stopping reverberations of the received signal by closing a switching element for grounding the both terminals of resonance circuit 1 when a signal of H level is supplied. A battery 12 for backup for holding data of shift register 5 is provided for this data carrier.

In this case, data is written into the data carrier by resetting shift register 5 and flipflop 6 using clear signal source 8 and then applying a signal of different duty ratios in a fixed period to a coil L for reception of the data carrier. A structure of a write/read control unit for such a data carrier is the same as the one shown in the conventional example stated above.

Figure 15:
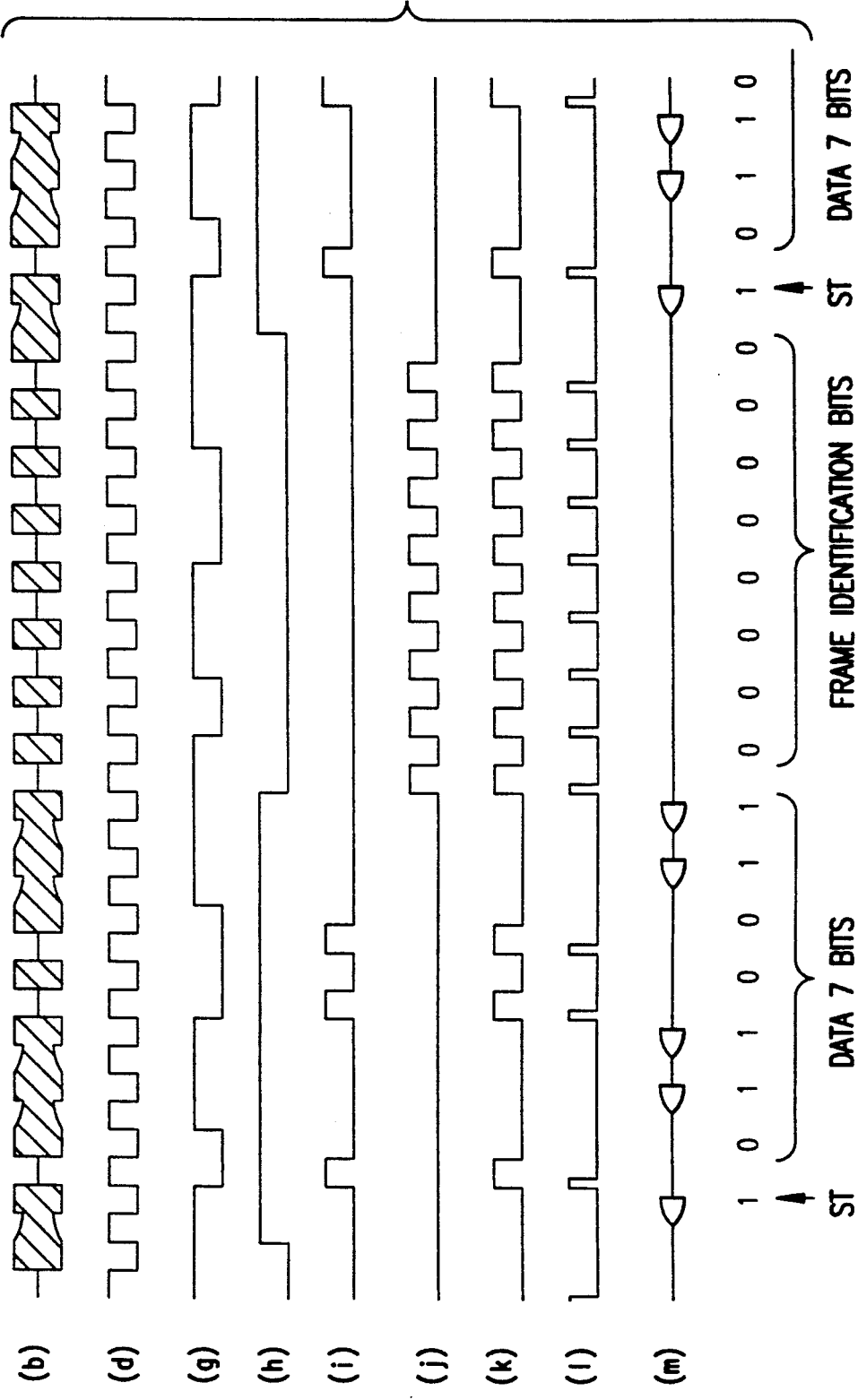
FIG. 15 is a waveform diagram showing a waveform of each portion at the time of reading data in this embodiment.

The operation in accordance with this embodiment will now be described. Since writing of data is the same as that in the above-mentioned first embodiment, a description thereof will be omitted here. At the time of reading data, when the write/read control unit reads data from the data carrier, a signal is supplied, having a constant duty ratio, for example, 50% in the same period as that at the time of writing data. As a result, the signal is shaped through resonance circuit 1 and waveform shaping circuit 2. Accordingly, a signal shown in FIG. 15(d) is outputted from monostable multivibrator 4 and this signal is supplied to shift register 5, AND circuit 7 and counter 90 as a clock pulse. Therefore, a signal is read out from shift register 5 corresponding to the shift pulse as shown in FIG. 15(g). A signal is obtained from counter 90 of 8 bits, which repeats H and L levels every time 8 bits are read out as shown in FIG. 15(h). While counter 90 is at H level, a signal of NRZ "10110011" as shown in FIG. 15(i) and (k) is outputted from AND circuit 7 by the logical product of this clock and the read output of shift register 5 and supplied to monostable multivibrator 93 through OR circuit 92. Accordingly, a signal as shown in FIG. 15(i) is supplied from monostable multivibrator 93. Monostable multivibrator 93 generates a vibration absorption control signal and supplies the same to vibration absorbing circuit 11 at the time of falling of the input pulse for a short period of time of ½ period or less. Vibration absorbing circuit 11 closes a switching element connected to the both terminals of resonance circuit 1. Then, the amplitude of the resonance is stopped by this pulse as shown in FIG. 15(b). Accordingly, a signal as shown in FIG. 15(m) is received at the reception block diagram of a read/write head (not shown), and data can be received by demodulating this signal.

Though AND circuit 7 places an inhibition when counter 90 of 8 bits attains L level, so that the output of shift register 5 is not read out and, in return, the clock signal is read out as it is from AND circuit 11 as shown in FIG. 15(d) and (j). Accordingly, the clock pulse is supplied to monostable multivibrator 93 through OR circuit 92 as shown in FIG. 15(k), and a vibration absorption pulse as shown in FIG. 15(l) is supplied to resonance circuit 1. Therefore, during that time, reception of the read/write head is always 0. Then, when counter 90 attains H level again, the data is sequentially read out following a start bit 1 read out from shift register 5 and a vibration absorption pulse is generated through AND circuit 7. Reverberations are inhibited as shown in FIG. 15(b) during a period when this pulse is supplied. Accordingly, a signal is obtained, with reverberations when the logic signal is H with a constant duty ratio, and without reverberations when the logic signal is 0 at the both terminals of resonance circuit 1 as shown in FIG. 15(b). Since this signal is also detected in the same way on the side of a read/write head (not shown), the read/write head can read out a signal written into shift register 5 based on the presence or absence of the reverberations as shown in FIG. 15(h) and (i). In this way, data can be stored using the first 1 bit of the shift register as a start bit (ST) and the portion other than that as data bits (in this case, 7 bits). Bits for identifying a frame are used so that the start position of data can be correctly recognized at the next time of reading even if reading of data is stopped halfway. Then, it is possible to clearly recognize the data portion by reading out frame identification bits for the bit lines using a counter of the bit lines the same as that of the shift register.

As has been described in detail, in accordance with the present invention, even if reading is stopped halfway, it is possible, in the next reading, to certainly read out the written data from a start bit after the frame identification bits are ended. As no identification code is used in this embodiment, the number of bits obtained by subtracting 1 bit from the bit number of the shift register can be used as a user area, and an effect can be obtained that a data carrier of a small storage capacity can be made with a highly simplified structure.

Embodiment 6

Figure 16:
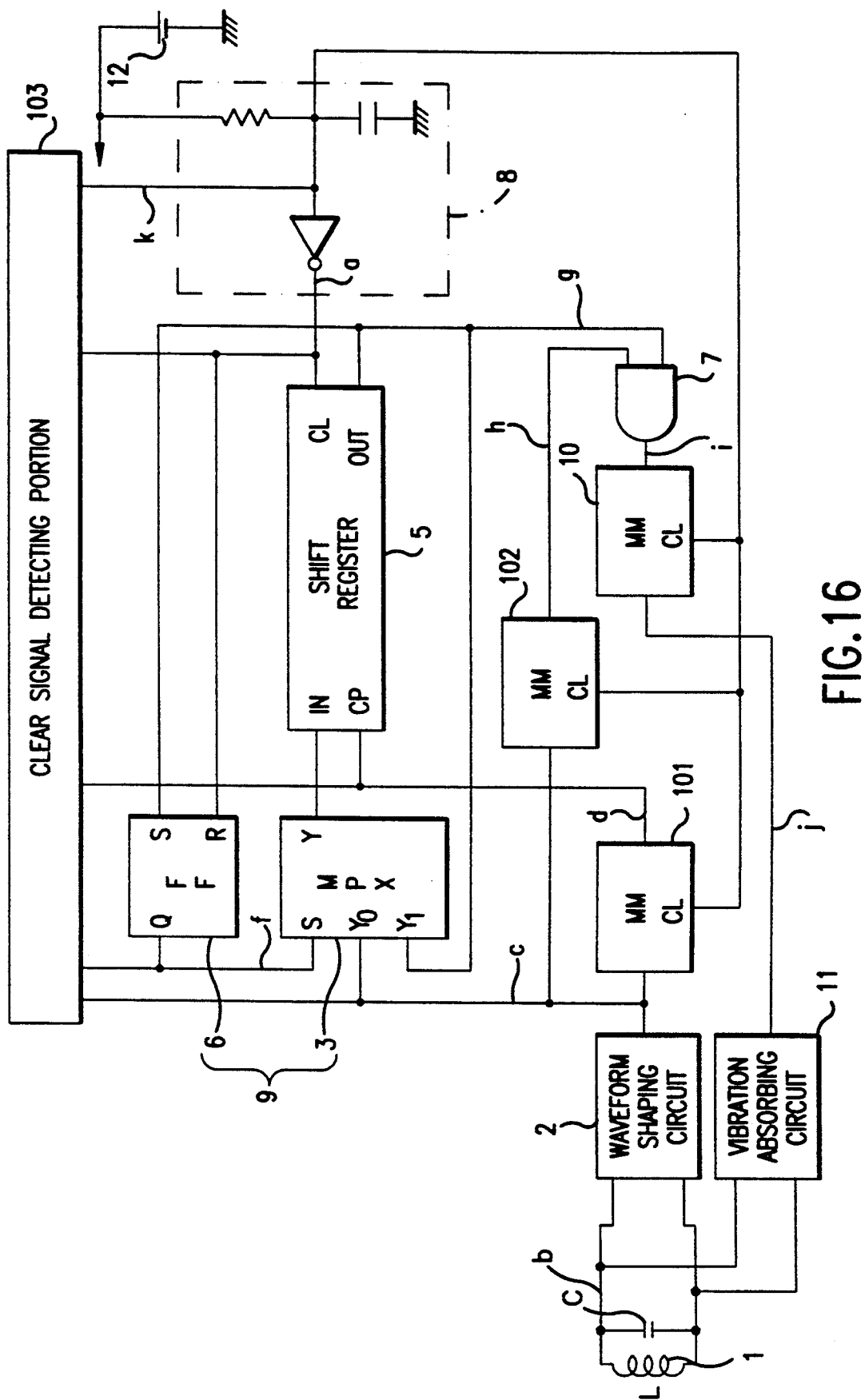
FIG. 16 is a block diagram illustrating an overall structure of a data carrier in accordance with a sixth embodiment of the present invention.
Figure 17:
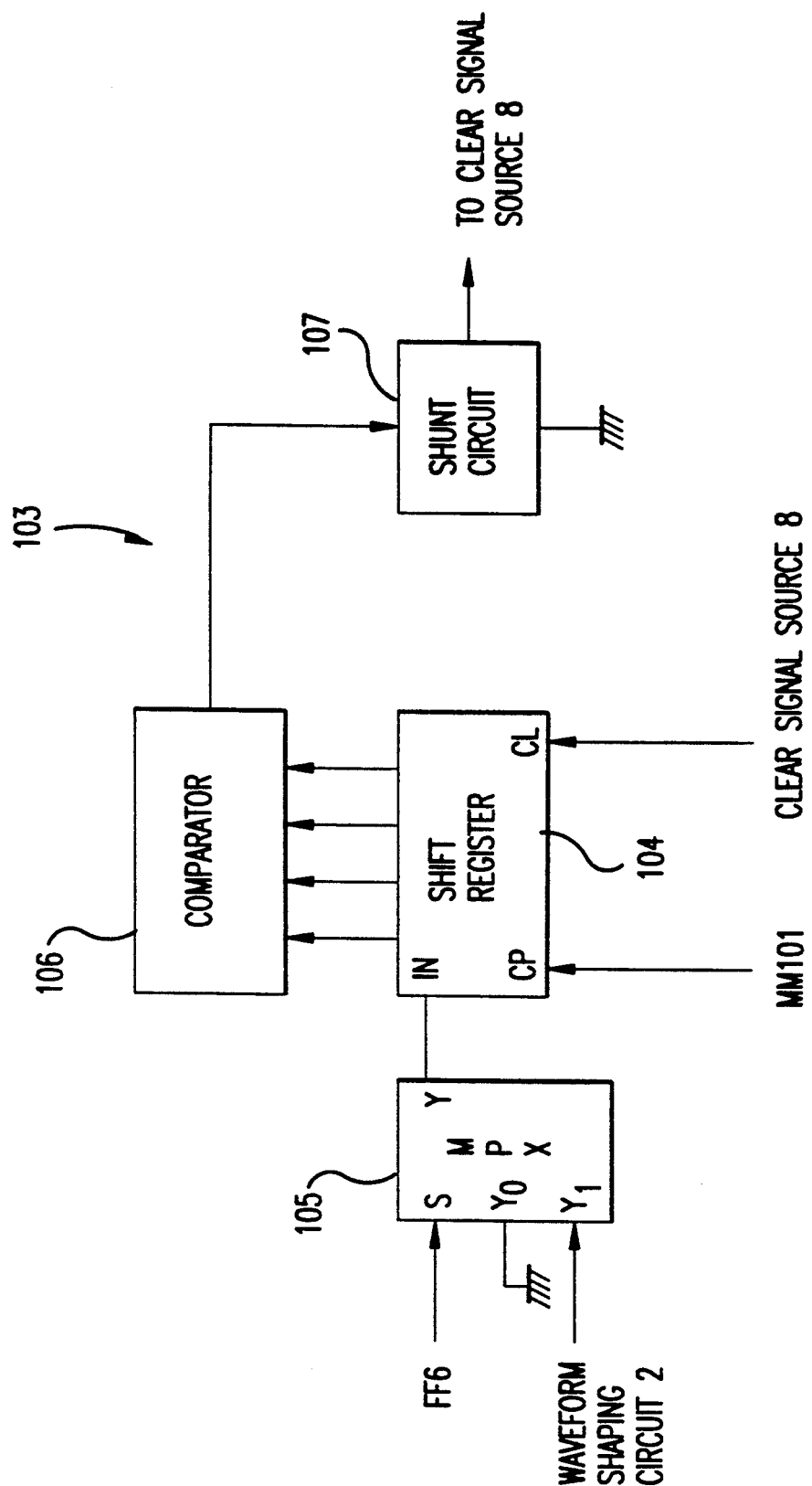
FIG. 17 is a block diagram illustrating a structure of a clear signal detecting portion of the data carrier in accordance with the sixth embodiment.

A sixth embodiment of the present invention will now be described. In this embodiment, data within a shift register is removed by externally sending a clear command to a data carrier, and new data can be arbitrarily written. FIG. 16 is a block diagram illustrating the overall structure of a data carrier in accordance with this embodiment and FIG. 17 is a block diagram illustrating a structure of a clear signal detecting portion. Portions the same as those in the first embodiment stated above are given the same reference designations in these figures and detailed descriptions thereof will be omitted here. In this embodiment, the output of a waveform shaping circuit 2 is supplied to monostable multivibrators 101 and 102 in addition to a multiplexer 3. Monostable multivibrator 101 generates a clock signal with a duty ratio of 40% based on the applied received signal as will be stated later and monostable multivibrator 102 generates a clock signal with a duty ratio of 50% based on the received signal as stated below. The output of monostable multivibrator 101 is applied to a shift register 5 and a shift register 104 of a clear signal detecting portion 103 as a shift pulse. The clear signal detecting portion, as shown in FIG. 17, causes the input applied to shift register 104 to be at L level all the time when the Q output of a flipflop 6 is at L level, and causes the output of waveform shaping circuit 2 to be the input of shift register 104 when Q is at H level. Shift register 104 of clear signal detecting portion 103 is a shift register of ½ of the number of bits of shift register 5, i.e., 4 bits in this embodiment, and each bit thereof is applied to a comparator 106 of a digital type. When a parallel signal of shift register 104 is a prescribed command, for example, "0011", comparator 106 detects the data string and supplies the same to a shunt circuit 107. Shunt circuit 107 clears each portion by grounding the output terminal of a clear signal source 8. The output of monostable multivibrator 102 is supplied to an AND circuit 7. AND circuit 7 supplies a logical product of input signals to a monostable multivibrator 10 and generates a vibration absorption pulse in the same way as in the above-mentioned first embodiment.

Figure 18:
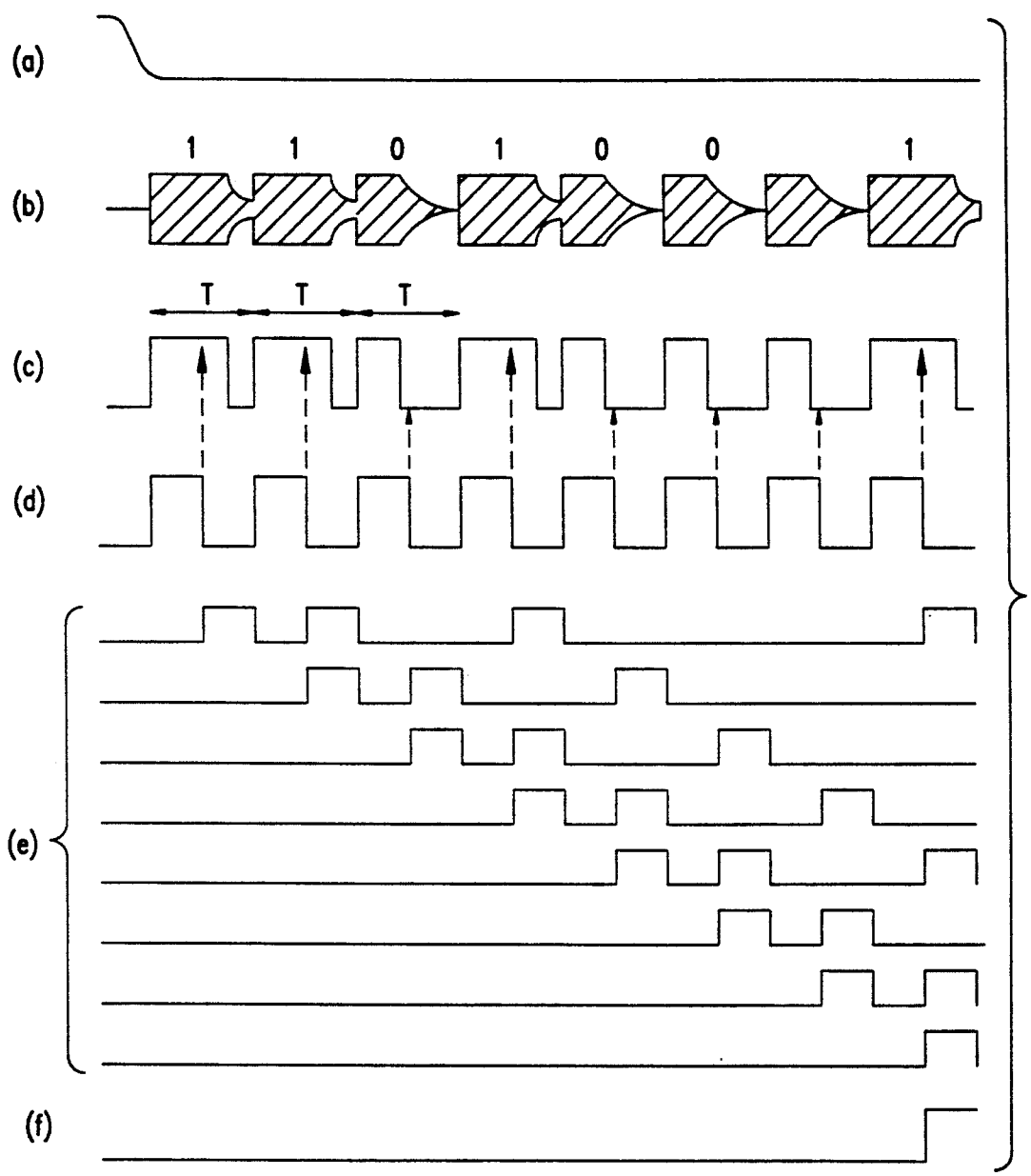
FIG. 18 is a waveform diagram showing a waveform of each portion at the time of writing data.
Figure 19:
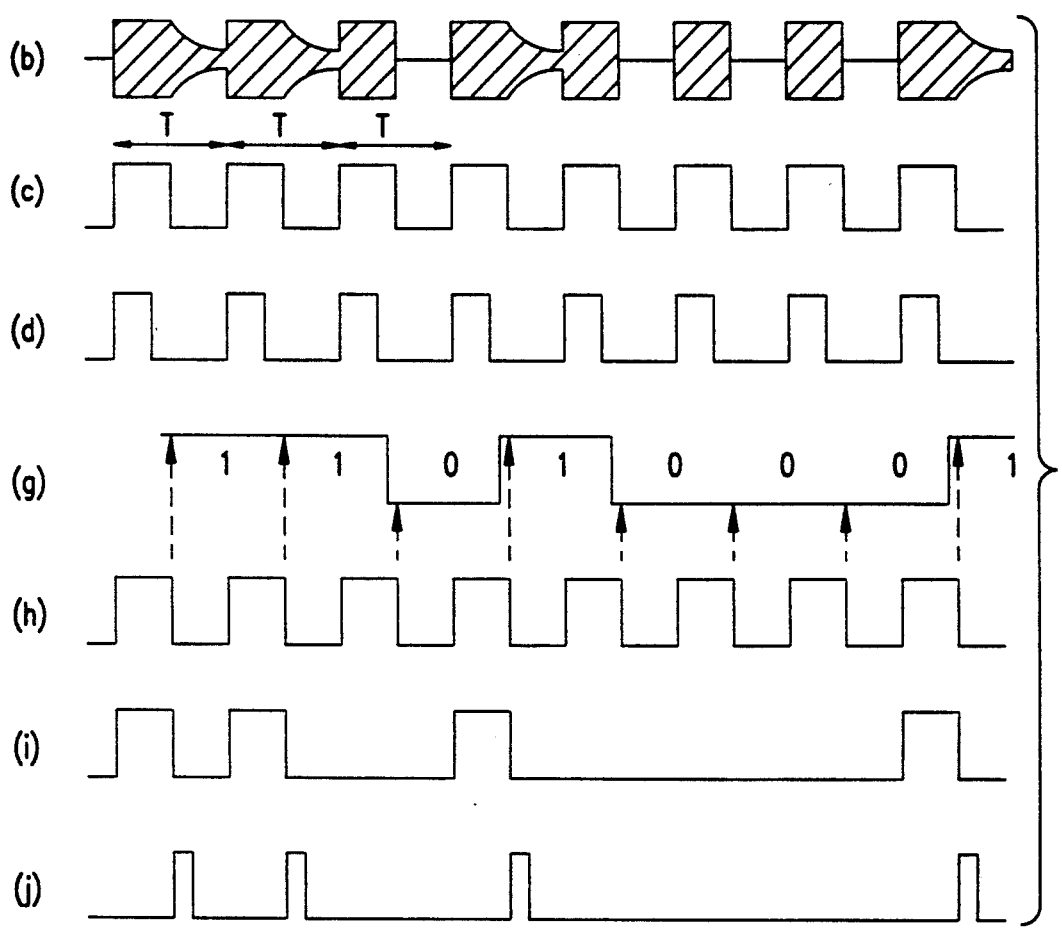
FIG. 19 is a waveform diagram showing a waveform of each portion at the time of reading data.
Figure 20:
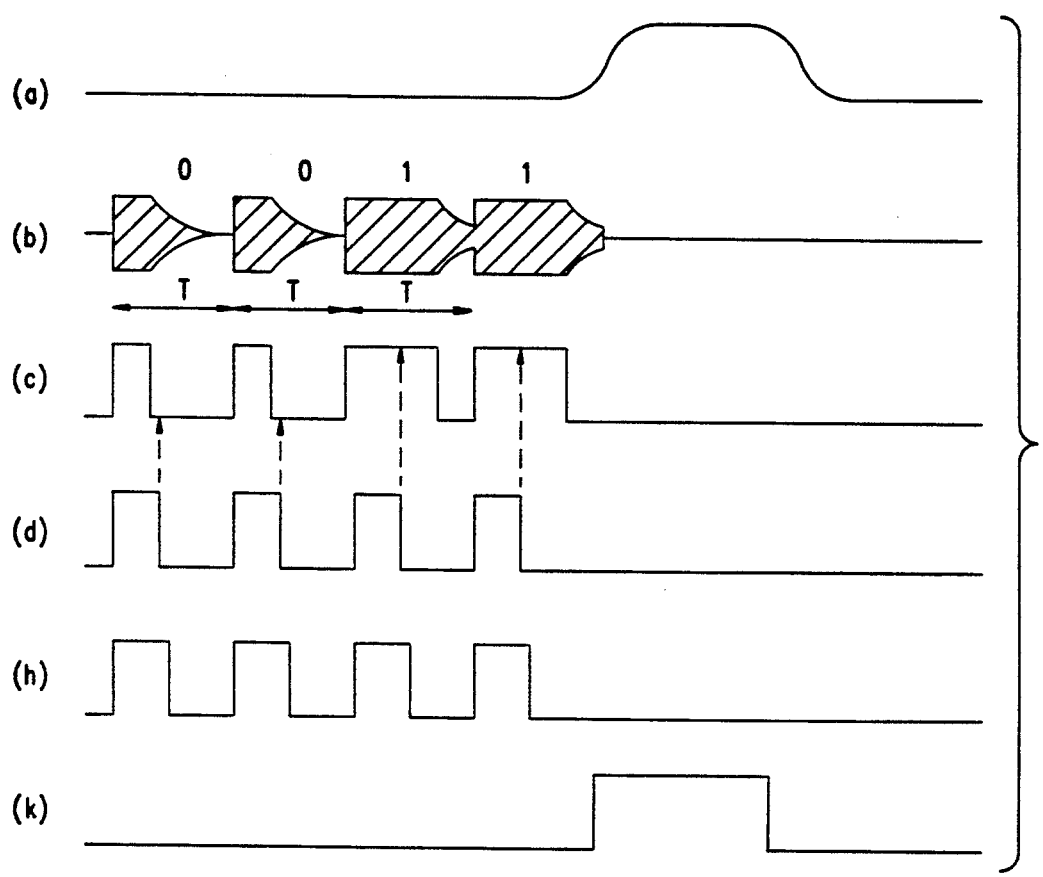
FIG. 20 is a waveform diagram showing a waveform of each portion at the time of clearing data of the data carrier.

The operation in accordance with this embodiment will now be described with reference to the waveform diagrams in FIGS. 18 to 20. In these figures,(a) to (k) indicate waveforms of a to k in FIG. 16. Firstly, when the power supply is turned on before writing data, a clear signal from clear signal source 8 resets shift register 5 and flipflop 6. Then, a waveform in which a signal of a fixed period T is intermittently generated is inputted with a duty ratio corresponding to data to be written from a read/write control unit (not shown). For example, a signal of a duty ratio of 70% at logic "1" and of a duty ratio of 30% at logic "0" is supplied as shown in FIG. 18(b) and supplied to a coil L for reception. In this way, the signal is received by resonance circuit 1 and envelop detected by waveform shaping circuit 2, and a signal as shown in FIG. 18(c) can be obtained by discriminating the same with respect to a predetermined level. This signal is supplied to monostable multivibrator 101 and applied to shift register 5 as a signal of a duty ratio of 40% dividing the period T into 4:6 as shown in FIG. 18(d). Since flipflop 6 is reset at first, the output of waveform shaping circuit 2 is written into shift register 5 through multiplexer 3.

As shift register 5 has a structure of 8 bits, when data of 8 bits is written as shown in FIG. 18(e), the output of the data output terminal of shift register 5 attains H level. As a result, as shown in FIG. 18(f), flipflop 6 is inverted and then the output of shift register 5 is supplied to the input of shift register 5 through multiplexer 3 as it is. Therefore, even if data is transmitted, the data is not written in a duplicated way and data of shift register 5 circulates, so that the data is held in shift register 5. In this case, data to be written (start bit) at first should be "1" in order to change shift register 5 from the write mode to the circulation mode in the same way as in the first embodiment.

Reading of data will now be described with reference to the waveform diagram of FIG. 19. The write/read control unit supplies a signal of a fixed duty ratio, for example, 50% in the same period as that at the time of writing data. In this way, the signal is shaped through resonance circuit 1 and waveform shaping circuit 2 and this waveform is shaped by waveform shaping circuit 2. Accordingly, a signal of a duty ratio 40% is outputted from monostable multivibrator 101 as shown in FIG. 19(d) and this signal is supplied to shift register 5 as a shift pulse. As a result, data "11010001" of NRZ held is read out from shift register 5, corresponding to the shift pulse as shown in FIG. 19(g). At this time, a signal of a duty ratio of 50% is applied to AND circuit 10 by monostable multivibrator 102, in synchronization with the output of waveform shaping circuit 2 as shown in FIG. 19(h). Accordingly, a logical product signal shown in FIG. 19(i) is supplied from AND circuit 10 and provided to monostable multivibrator 10. A vibration absorption control signal is generated and supplied to a vibration absorbing circuit 11 at the time of falling of the input pulse for a short period of time of ¼ period or less in monostable multivibrator as shown in FIG. 19(j). Vibration absorbing circuit 11 closes a switching element connected to the both terminals of resonance circuit 1. Then, this pulse stops reverberations of resonance as shown in FIG. 19(b). Therefore, a signal of reverberations is received at the receiving portion of a read/write head (not shown) and data can be received by demodulating this signal.

When a signal of 4 bits with a duty ratio 70% or 30%, for example, "0011" is sent as a clear command from the read/write head as shown in FIG. 20(b), the signal is also simultaneously transmitted to shift register 104. Shunt circuit 107 provides a detection signal of the clear command obtained by detecting this signal by comparator 106. Shunt circuit 107 grounds the output terminal of clear signal source 8 for a certain period of time as shown in FIG. 20(k). Accordingly, the clear operation is carried out again and data of shift register 5 is cleared. Thereafter, another data can be written in the data carrier as stated above by sending new data from the side of the read/write head.

Two monostable multivibrators 101 and 102 are employed for generating a signal having different duty ratios in this embodiment. If monostable multivibrator 102 of a duty ratio of 50% is employed for the shift pulse of shift register 5, there is a provability that it coincides with the clear command at the time of reading data by chance, and in this case, the data is removed. Therefore, it is necessary to prevent such a situation before it happens. It is possible to prevent the removal of data and absorb the vibration in accordance with the signal from the read/write head by employing monostable multivibrator 101 of a duty ratio of 40% for reading data and monostable multivibrator 102 of a duty ratio of 50% for generating a vibration absorption pulse.

INDUSTRIAL APPLICABILITY

As has been described in detail, in accordance with this embodiment, data within a data carrier can be removed and new data can be written by sending a clear command from the side of the read/write head. Accordingly, an effect can be obtained in which a data carrier for a wider variety of purposes and capable of writing and erasing a small amount of data can be made with a highly simplified structure.

We claim:

1. A data carrier comprising:
   a resonance circuit for receiving a PWM signal having different duty ratios corresponding to write data containing identification codes in a transmission mode and having a fixed duty ratio in a reception mode,
   a waveform shaping circuit for smoothing and waveform shaping a received output obtained at said resonance circuit,
   a shift register for circulating and holding data, to which a signal obtained from said waveform shaping circuit is supplied as a shift pulse,
   signal switching means for switching an input supplied to said shift register by an output of said shift register from the output of said shaping circuit to the output of the shift register, and
   a vibration absorbing circuit for controlling reverberations of said resonance circuit based on a signal read from said shift register when a signal of a fixed duty ratio is supplied in the reception mode.

2. The data carrier according to claim 1, comprising:
   a battery for supplying power to each portion of the data carrier,
   a voltage detection circuit for detecting a voltage drop of said battery,
   a signal inversion circuit for inverting a signal read from said shift register when the drop of the voltage is detected by said voltage detection circuit, and
   a vibration absorbing circuit for controlling the reverberations of said resonance circuit based on the signal read from said shift register when a signal of a fixed duty ratio is supplied in the reception mode.

3. The data carrier according to claim 1 or 2, wherein said identification codes are recorded, being broken up into the first and last plurality of bits of the bit length of said shift register.

4. The data carrier according to claim 3, wherein the first bit of said identification codes is at a logic level for converting the shift register from a write mode to a circulation mode based on the output when data is written into said shift register and the data is read out.

5. A data carrier comprising:
   a resonance circuit for receiving a PWM signal having different duty ratios corresponding to write data containing a start bit in a transmission mode and having a fixed duty ratio in a reception mode,
   a waveform shaping circuit for smoothing and waveform shaping a received output obtained at said resonance circuit,
   a shift register for circulating and holding write data obtained from said waveform shaping circuit, to which a signal obtained from said waveform shaping circuit is supplied as a shift pulse,
   signal switching means for switching an input applied to said shift register by an output of said shift register from an output of said waveform shaping circuit to the output of shift register,
   a counter for counting the number of shift pulses to said shift register,
   read data selecting means for selecting a shaping pulse obtained from said waveform shaping circuit and the output of said shift register by the output of said counter, and
   a vibration absorbing circuit for controlling the reverberations of said resonance circuit based on a signal read out by said read data selecting means when a signal of a fixed duty ratio is supplied in the reception mode.

6. The data carrier according to claim 5, wherein said counter inverts the output when it counts the same number of bits as that of said shift register.

7. A data carrier comprising:
   a resonance circuit for receiving a PWM signal having different duty ratios corresponding to write data containing a start bit or a clear command in a transmission mode and having a fixed duty ratio in a reception mode,
   a waveform shaping circuit for smoothing and waveform shaping a received output obtained at said resonance circuit,
   a shift register for circulating and holding write data obtained by said waveform shaping circuit, to which a signal obtained from said waveform shaping circuit is supplied as a shift pulse,
   signal switching means for switching an input supplied to said shift register by an output of said shift register from an output of said waveform shaping circuit to the output of the shift register,
   a clear signal detecting portion for detecting a clear command obtained by said waveform shaping circuit and resetting said shift register at the time of detection, and
   a vibration absorbing circuit for controlling the reverberations of said resonance circuit based on a signal read out from said shift register when a signal of a fixed duty ratio is supplied in the reception mode.

8. The data carrier according to claim 7, wherein said clear signal detecting portion includes a shift register to which the output of said waveform shaping circuit is applied, and a comparator for comparing a parallel output of said shift register and a data string of the clear command.

9. The data carrier according to claim 7, comprising:
a first monostable multivibrator to which the output of said waveform shaping circuit is supplied, for generating a signal of a duty ratio different from those in the reception mode and the transmission mode and supplying the same to said shift register as a shift pulse, and
a second monostable multivibrator to which the output of said waveform shaping circuit is applied, for generating a clock signal of a duty ratio equal to that in said reception mode and supplying the clock signal to said vibration absorbing circuit.

* * * * *